United States Patent [19]

Bodenrader

[11] 4,214,985

[45] Jul. 29, 1980

[54] METHOD FOR SEWAGE TREATMENT WITH BACTERIA

[76] Inventor: Bonnie J. Bodenrader, 11 Castle Heights Rd., Andover, Mass. 01810

[21] Appl. No.: 963,675

[22] Filed: Nov. 27, 1978

[51] Int. Cl.² .............................................. C02C 1/02
[52] U.S. Cl. ....................................... 210/11; 210/64; 71/12; 426/43
[58] Field of Search ...................... 210/2, 4, 10, 11, 18, 210/64; 71/12, 13; 195/2, 11, 96; 426/43, 53

[56] References Cited

U.S. PATENT DOCUMENTS

| | | | |
|---|---|---|---|
| 3,546,812 | 12/1970 | Kobayashi et al. | 71/12 X |
| 3,751,338 | 4/1973 | Farris | 210/11 X |
| 3,801,499 | 4/1974 | Luck | 210/11 |
| 3,900,572 | 8/1972 | Peer | 426/43 |
| 3,961,078 | 6/1976 | Stitt | 210/11 X |
| 4,018,650 | 4/1977 | Busta et al. | 210/11 X |

Primary Examiner—Thomas G. Wyse
Attorney, Agent, or Firm—Richard L. Stevens

[57] ABSTRACT

A process for the treatment of sewage wherein the sludge is innoculated with a bacteria, L. plantarum, and a carbohydrate such as lactose is admixed therewith. The addition of the bacteria and the carbohydrate without more, drops the pH of the sludge to below 4.0. This results in the elimination of pathogenic bacteria and renders the sludge suitable for use as a soil extender without any further environmental constraints.

23 Claims, No Drawings

METHOD FOR SEWAGE TREATMENT WITH BACTERIA

BACKGROUND OF THE INVENTION

Ruminants possess the unique ability to utilize nonprotein nitrogen sources to fulfill a major portion of their dietary protein requirements. These include urea and ammonium salts of organic acids such as ammonium lactate, ammonium acetate and ammonium propionate. It has been proven that ammonium salts are equivalent to soybean meal and superior to urea and nitrogen supplements when fed to feed lot cattle. See "Fermentative Conversion of Potato-Processing Wastes Into a Crude Protein Feed Supplement by Lactobacilli", Forney, L. J. et al, Vol. 18, Developments In Industrial Microbiology, Proceedings of the Thirty-Third General Meeting of the Society for Industrial Microbiology, Aug. 14–20, 1976, Jekyl Island, Ga., pages 135–143. Thus it has been suggested that potato wastes, when properly treated, may be used as a feed.

In a non-related field the present problems attendant to sewage waste disposal are well documented. The studies currently being conducted and the processes being tested to effectively handle sewage materials are innumerable. Raw primary sludge usually contains $10^8$ total bacteria per milliliter (including coliform and gram negative bacteria). The efficiency of secondary treatment plants is highly variable and cannot be relied upon to produce bacteriologically safe effluent and sludge. The bacterial concentration of digested sludge typically ranges from $10^4$ to $10^8$ per milliliter. The application of raw sludge to landfill is restricted as being dangerous. The percentage of digested sludge applied to the land is expected to increase as more stringent controls are imposed on ocean and fresh water dumping as well as on air pollution from incineration.

It should be noted that proper temperature, moisture and organic nutrients found in the soil and agricultural land may actually stimulate after-growth of pathogenic bacteria. Members of each group of sewage pathogens such as salmonella and shigella can survive sewage treatment and although they remain in reduced numbers after treatment they can be recovered from the receiving soil. Enteric bacteria may survive for months in the soil therefore surviving longer than the growing season for crops. Contaminated fruits and vegetables could present a health hazard if eaten raw even after a germicidal wash. Therefore although land fill for treated sewage is being encouraged the above additional problems are presented.

The above referenced article teaches that bacteria can be successfully used with waste from potato processing and that the wastes from the potato processing will support the growth of a specific bacteria to produce a feed for ruminants. However, in the described process additional growth supplements (minerals, yeast extract, trypticase and buffers) are also necessary to support the growth of the bacteria. Further the described process requires the use of carbon dioxide to stimulate the growth of the lactobacilli.

I have discovered a process wherein sewage whether raw or digested can be made suitable for use either as animal feed or as a safe and effective fertilizer for crops utilizing specific bacteria and a carbohydrate.

SUMMARY OF THE INVENTION

My invention is broadly directed to a process for the treatment of sewage (sludge) either raw or digested which treatment will render the sewage acceptable either as an animal feed, or as a fertilizer or an environmentally acceptable landfill or the like. My process includes innoculating sewage with a bacteria selected from the genus lactobacillus and admixing therewith a carbohydrate. This stimulates the growth of the lactobacilli and lowers the pH of the sewage. A pH of 4.5 or less is usually required to eliminate the growth of non-lactobacilli bacteria. In my invention the pH is lowered to about 4.0 resulting in a bactericidal and/or bacteriostatic condition for all bacterial other than lactobacilli. In my invention the process is preferably carried out at ambient temperatures of between about $5°-53°$ C. say for example $24°-40°$ C., preferably $30°-35°$ C.

My method in one embodiment uses common sludge and an industrial carbohydrate rich waste which are combined without further nutrient addition and lactobacilli is added. The lactobacilli treated waste quickly acquires a pH of less than 4.5, preferably 4.0 or less resulting in an environmentally safe fertilizer or soil extender. In the preferred embodiment the sludge is subject to a pretreatment sterilization step.

In one aspect of my invention synthetic protein can be produced for ruminant consumption such as by the use of any processing plant waste in which a carbohydrate for example lactose is present. Lactose is added to raw or digested sludge and innoculated with lactobacillius and preferably *L. plantarum*. The lactic acid produced by the *L. plantarum* can be neutralized continuously with an aqueous ammonia to form ammonium lactate, a synthetic protein for ruminants. The final product of this recycling process will contain a mixture of ammonium lactate and harmless *L. plantarum* which is naturally found in the intestinal tract of cattle as well as in cattle dung.

The preferred embodiment of my invention uses the specific bacteria *L. plantarum* and the carbohydrate lactose.

*L. plantarum* is capable of fermenting all common sugars (except rhamrose) thus having the ability to digest any industrial carbohydrate waste such as potato processing waste, agricultural waste, vegetable pickling waste, cheese manufacturing waste (whey) packing house waste, sugar refinery waste (molasses), corn steep liquor and glucose which may be synthesized from wood chips (cellulose), *L. plantarum* is homofermentative-non-gas producing. The only significant metabolic product that *L. plantarum* produces is lactic acid. The only exception is when pentoses are used as the carbohydrate source and equal amounts of acetic acid and lactic acid are produced. The preferred temperature range for *L. plantarum* is $30°-35°$ C. Most importantly *L. plantarum* grows well at a relatively low pH, less than 4.5, which pH is generally unfavaorable for the growth of most contaminant microorganisms.

DESCRIPTION OF PREFERRED EMBODIMENTS

My invention will be described in reference to the treatment of sludge, as defined hereinafter, with a specific bacteria selected from the genus Lactobacillus and a carbohydrate.

More specifically the bacteria used is *L. plantarum* and carbohydrate used as lactose.

*L. plantarum* ATCC 14917 was innoculated into 50 milliliters of heat sterilized tomato juice broth (15 minutes, 120° C., 15 psi) and incubated for 18 hours at 30° C. without shaking.

The raw sludge was obtained from Deer Island Treatment Plant of Boston, Mass.

The raw sludge was diluted one to one (1:1) with distilled water and mixed in a Hamilton Beach blender for 5 minutes at high speed.

Digested sludge (secondary sludge from the raw sludge) was mixed by shaking and was not diluted.

Heat sterilized sludge samples were prepared by pouring 100 milliliters of sludge into 500 milliliter Erlenmeyer flasks and were heated for 30 minutes at 121° C.

Irradiated sterilized sludge samples were prepared by pouring 50 milliliter aliquots of sludge into 250 milliliter plastic, capped culture flasks and irradiating with a Van de Graaff machine at a minimum absorbed radiation dose of 4 megrad. After irradiation, the sludge samples were transferred into sterile 500 milliliter Erlenmeyer flasks resulting in 100 milliliters of sludge in each flask.

A 15% lactose solution was prepared by dissolving 15 grams of lactose in 100 milliliters of distilled water at 38° C. using a heating magnetic stirrer. The 15% lactose solution was sterilized by passing it through a filter such as a Millipore filter, 45 millimicrons. 7.1 milliliters of this lactose solution was added to each 100 milliliter sample of sludge resulting in a 1% lactose solution.

After heat sterilization both the raw and digested sludges were checked. The raw sludge had a pH of 5.6 and the digested sludge had a pH of about 8.6. The pH of the digested sludge was lowered by the addition of about 4 milliliters of 10% concentrated hydrochloric acid.

After irradiation the raw sludge had a pH of 5.6 and the digested sludge had a pH of about 9.0. The pH of the digested sludge was lowered by the addition of about 4 milliliters of 10% hydrochloric acid.

The *L. plantarum* that was grown in the tomato juice broth was harvested in the following manner. The cell culture was poured into a sterile 50 milliliter Serval tube (Serval head type 8834) and centrifuged at 7000 RPM for 10 minutes. The supernatant was decanted and the *L. plantarum* precipitate was suspended in 18 milliliters of 0.1% Bacto-peptone water. This was centrifuged as above at 7000 RPM for 10 minutes. The supernatant from this step was decanted and the precipitate was suspended in 9 milliliters of 0.1% bacto-peptone water. The *L. plantarum* concentration was $10^9$/ml. This was diluted to $10^5$/ml and 1 milliliter of this $10^5$/ml. *L. plantarum* was used as indicated in the following examples.

The sludge samples which were sterilized were confirmed and monitored by plating on TSY (trypticase, soya, yeast extract) agar and incubating for 15 hours at 30° C. The *L. plantarum* per ml of innoculated sludge was determined by plating 0.1 ml samples on tomato juice agar and incubating at 37° C. for 3 days.

A 5 ml aliquot was removed from each sample each day for pH determination and bacteria counts. In the following examples the sludge samples were 100 milliliters, where lactose was added it was 7.1 milliliters 15% solution, and where the *L. plantarum* was added it was one milliliter added to 100 ml of sludge sample. Where the designation L. p. is used it refers to the *L. plantarum* bacteria count/milliliter.

EXAMPLE I

Raw sludge heat sterilized
No *L. plantarum* added
No lactose added

| Day | 0 | 1 | 2 | 3 | 4 | 5 |
|---|---|---|---|---|---|---|
| pH | 5.6 | 5.7 | 5.7 | 5.7 | 5.8 | 5.8 |

EXAMPLE II

Raw sludge heat sterilized
No *L. plantarum* added
1% lactose added

| Day | 0 | 1 | 2 | 3 | 4 | 5 |
|---|---|---|---|---|---|---|
| pH | 5.6 | 5.7 | 5.8 | 5.8 | 5.8 | 5.8 |

EXAMPLE III

Raw sludge heat sterilized
*L. plantarum* added
No lactose added

| Day | 0 | 1 | 2 | 3 | 4 | 5 |
|---|---|---|---|---|---|---|
| pH | 5.6 | 5.6 | 5.6 | 5.7 | 5.8 | 5.8 |
| L.p. | $1.80 \times 10^2$ | $1.68 \times 10^7$ | $2.53 \times 10^7$ | $3.77 \times 10^6$ | $1.77 \times 10^6$ | $1.65 \times 10^6$ |

EXAMPLE IV

Raw sludge heat sterilized
*L. plantanum* added
1% lactose added

| Day | 0 | 1 | 2 | 3 | 4 | 5 |
|---|---|---|---|---|---|---|
| pH | 5.6 | 5.6 | 5.2 | 4.0 | 3.7 | 3.7 |
| L.p. | $1.93 \times 10^2$ | $2.35 \times 10^7$ | $1.73 \times 10^8$ | $3.71 \times 10^8$ | $1.12 \times 10^8$ | $3.20 \times 10^7$ |

EXAMPLE V

Raw sludge irradiated
No *L. plantunum* added
No Lactose added

| Day | 0 | 1 | 2 | 3 | 4 | 5 |
|---|---|---|---|---|---|---|
| pH | 5.6 | 5.8 | 5.7 | 5.8 | 5.8 | 5.7 |

EXAMPLE VI

Raw sludge irradiated
No *L. plantunum* added
1% lactose added

| Day | 0 | 1 | 2 | 3 | 4 | 5 |
|---|---|---|---|---|---|---|
| pH | 5.6 | 5.8 | 5.7 | 5.8 | 5.8 | 5.8 |

EXAMPLE VII

Raw sludge irradiated
*L. plantunum* added
No lactose added

| Day | 0 | 1 | 2 | 3 | 4 | 5 |
|---|---|---|---|---|---|---|
| pH | 5.4 | 5.3 | 5.5 | 5.5 | 5.5 | 5.4 |

-continued

Raw sludge irradiated
L. plantunum added
No lactose added

| Day | 0 | 1 | 2 | 3 | 4 | 5 |
|---|---|---|---|---|---|---|
| L.p. | $1.98 \times 10^2$ | $9.43 \times 10^7$ | $1.06 \times 10^8$ | $7.53 \times 10^7$ | $6.90 \times 10^7$ | $5.55 \times 10^7$ |

EXAMPLE VIII

Raw sludge irradiated
L. plantanum added
1% lactose added

| Day | 0 | 1 | 2 | 3 | 4 | 5 |
|---|---|---|---|---|---|---|
| pH | 5.6 | 4.6 | 3.8 | 3.8 | 3.7 | 3.7 |
| L.p. | $1.96 \times 10^2$ | $4.14 \times 10^8$ | $1.03 \times 10^9$ | $3.21 \times 10^8$ | $1.39 \times 10^8$ | $1.82 \times 10^7$ |

EXAMPLE IX

Digested sludge heat sterilized
No L. plantanum added
No lactose added

| Day | 0 | 1 | 2 | 3 | 4 | 5 |
|---|---|---|---|---|---|---|
| pH | 6.2 | 6.4 | 6.5 | 6.6 | 6.7 | 6.9 |

EXAMPLE X

Digested sludge heat sterilized
No L. plantanum added
1% lactose added

| Day | 0 | 1 | 2 | 3 | 4 | 5 |
|---|---|---|---|---|---|---|
| pH | 6.2 | 6.4 | 6.5 | 6.6 | 6.7 | 6.9 |

EXAMPLE XI

Digested sludge heat sterilized
L. plantanum added
No lactose added

| Day | 0 | 1 | 2 | 3 | 4 | 5 |
|---|---|---|---|---|---|---|
| L.p. | $2.82 \times 10^3$ | $1.13 \times 10^6$ | $2.99 \times 10^6$ | $2.98 \times 10^6$ | $3.01 \times 10^6$ | $2.88 \times 10^6$ |

EXAMPLE XII

Digested sludge heat sterilized
L. plantarum added
1% lactose added

| Day | 0 | 1 | 2 | 3 | 4 | 5 |
|---|---|---|---|---|---|---|
| pH | 6.2 | 6.4 | 6.4 | 6.0 | 5.0 | 4.4 |
| L.p. | $2.81 \times 10^3$ | $1.56 \times 10^6$ | $6.46 \times 10^6$ | $4.44 \times 10^7$ | $2.07 \times 10^8$ | $4.06 \times 10^8$ |

EXAMPLE XIII

Digested sludge irradiated
No L. plantarum added
No lactose added

| Day | 0 | 1 | 2 | 3 | 4 | 5 |
|---|---|---|---|---|---|---|
| pH | 5.7 | 5.8 | 6.0 | .1 | 6.2 | 6.3 |

Digested sludge irradiated
No L. plantarium added
1% lactose added

| Day | 0 | 1 | 2 | 3 | 4 | 5 |
|---|---|---|---|---|---|---|
| pH | 5.7 | 5.8 | 6.0 | 6.1 | 6.2 | 6.3 |

EXAMPLE XIV

Digested sludge irradiated
No L. plantarum added
1% lactose added

| Day | 0 | 1 | 2 | 3 | 4 | 5 |
|---|---|---|---|---|---|---|
| pH | 5.7 | 5.8 | 6.0 | 6.1 | 6.2 | 6.3 |

EXAMPLE XV

Digested sludge irradiated
L. plantarum added
No lactose added

| Day | 0 | 1 | 2 | 3 | 4 | 5 |
|---|---|---|---|---|---|---|
| pH | 5.7 | 5.8 | 6.0 | 6.1 | 6.2 | 6.3 |
| L.p. | $2.96 \times 10^3$ | $4.77 \times 10^6$ | $8.21 \times 10^6$ | $7.77 \times 10^6$ | $1.04 \times 10^7$ | $9.73 \times 10^6$ |

EXAMPLE XVI

Digested sludge irradiated
L. plantarum added
1% lactose added

| Day | 0 | 1 | 2 | 3 | 4 | 5 |
|---|---|---|---|---|---|---|
| pH | 5.7 | 4.7 | 4.4 | 4.2 | 4.1 | 3.7 |
| L.p. | $3.21 \times 10^3$ | $1.56 \times 10^8$ | $2.26 \times 10^8$ | $1.56 \times 10^8$ | $1.48 \times 10^8$ | $1.36 \times 10^8$ |

In the above examples, I through XVI the initial pH of the digested sludge was about 7.0. If the pH of the digested sludge is adjusted, before sterilization, to bring it to within the range where L. plantarum is active the pH rises beyond this range after sterilization. Therefore in order to control successfully the pH of the digested sludge, adjustment with hydrochloric acid should take place after the sterilization process.

Based on the above examples whether or not heat sterilized or irradiated, for the raw sludge as long as both L. plantarum and lactose were not added the pH remained about the same i.e. no pH shift.

Where L. plantarum was added to heat sterilized sludge without lactose addition the bacteria count rose from $10^2$/ml to $10^7$/ml.

When L. plantarum is added to irradiated sludge without lactose addition the bacteria count rose from $10^2$/ml to $10^8$/ml. When both L. plantarum and lactose were added to the sterilized sludge unexpectedly the pH decreased and the bacteria count went up. For heat sterilized sludge the pH went from 5.6 to 3.7 and the bacteria count from $10^2$/ml to $10^8$/ml and for the irradiated sludge the pH went from 5.6 to 3.7 and the bacteria count from $10^2$/ml to $10^9$/ml.

For the digested sludge whether heat sterilized or irradiated as long as both *L. plantarum* and 1% lactose were added as with the raw sludge the pH decreased.

When *L. plantarum* was added to heat sterilized sludge without lactose addition the bacteria count rose from $10^3$/ml to $10^6$/ml. When *L. plantarum* was added to irradiated sludge without lactose addition the bacteria count rose from $10^3$/ml to $10^7$/ml.

When both *L. plantarum* and lactose were added to the sterilized sludge, the pH decreased and the bacteria count went up. For the heat sludge sterilized the pH decreased from 6.2 to 4.4 and the bacteria count rose from $10^3$/ml to $10^8$/ml and for the irradiated sludge the pH decreased from 5.7 to 3.7 and the bacteria count rose from $10^3$/ml to $10^8$/ml.

The following examples are directed to varying the amount of lactose added to the samples as identified above all of which samples have been innoculated with *L. plantarum*. The preparation of the sludges, lactose solution, harvesting of the *L. plantarum* etc. was conducted as for the examples I through XVI.

For the examples following XVII through XXII the concentration of the *L. plantarum* used was $1.0 \times 10^7$/ml.

EXAMPLE XVII

Raw Sludge irradiated

| Incubation time Days | Percent Lactose | | | | |
|---|---|---|---|---|---|
| | 5% | 3% | 1% | .5% | .25% |
| 0 | 5.63 | 5.63 | 5.63 | 5.96 | 5.95 |
| 1 | 3.95 | 4.05 | 4.58 | 5.07 | 5.16 |
| 2 | 3.82 | 3.90 | 4.18 | 4.15 | 4.23 |
| 3 | 3.76 | 3.80 | 3.95 | 3.70 | 3.97 |
| 4 | 3.70 | 3.73 | 3.80 | 3.53 | 3.97 |
| 5 | 3.70 | 3.73 | 3.80 | 3.46 | 3.97 |
| 10 | 3.68 | 3.73 | 3.76 | 3.49 | 3.97 |

EXAMPLE XVIII

Raw sludge heat sterilized

| Incubation time Day | Percent Lactose | | | | |
|---|---|---|---|---|---|
| | 5% | 3% | 1% | .5% | .25% |
| 0 | 5.63 | 5.63 | 5.63 | 6.28 | 6.28 |
| 1 | 4.51 | 4.57 | 4.65 | 6.40 | 6.40 |
| 2 | 4.27 | 4.30 | 4.45 | 6.30 | 6.35 |
| 3 | 4.11 | 4.20 | 4.38 | 5.60 | 5.10 |
| 4 | 4.03 | 4.10 | 4.30 | 4.00 | 4.13 |
| 5 | 4.01 | 4.08 | 4.29 | 3.50 | 3.80 |
| 10 | 3.98 | 4.02 | 4.10 | 3.49 | 3.80 |

EXAMPLE XIX

Raw sludge untreated

| Incubation time Days | Percent Lactose | | | | |
|---|---|---|---|---|---|
| | 5% | 3% | 1% | 0.5% | .25% |
| 0 | 5.48 | 5.50 | 5.53 | 5.53 | 5.53 |
| 1 | 3.95 | 3.95 | 4.04 | 4.40 | 5.03 |
| 2 | 3.70 | 3.70 | 3.85 | 5.00 | 5.03 |
| 3 | 3.55 | 3.58 | 3.95 | 5.00 | 5.03 |
| 4 | 3.48 | 3.50 | 4.33 | 4.97 | 5.10 |
| 5 | 3.40 | 3.43 | 5.00 | 4.98 | 5.20 |
| 10 | 3.33 | 3.50 | 5.30 | 4.58 | 5.35 |

EXAMPLE XX

Digested sludge irradiated

| Incubation Time Day | Percent Lactose | | | | |
|---|---|---|---|---|---|
| | 5% | 3% | 1% | .50% | .25% |
| 0 | 5.82 | 5.83 | 5.80 | 5.80 | 5.82 |
| 1 | 4.90 | 4.92 | 5.02 | 5.15 | 5.30 |
| 2 | 4.50 | 4.60 | 4.75 | 4.83 | 5.05 |
| 3 | 4.28 | 4.38 | 4.55 | 4.70 | 4.90 |
| 4 | 4.20 | 4.23 | 4.95 | 4.70 | 4.90 |
| 5 | 4.10 | 4.15 | 4.40 | 4.68 | 4.95 |
| 10 | 3.93 | 4.00 | 4.05 | 4.73 | 5.13 |

EXAMPLE XXI

Digested sludge heat sterilized

| Incubation Time Day | Percent Lactose | | | | |
|---|---|---|---|---|---|
| | 5% | 3% | 1% | .50% | .25% |
| 0 | 5.40 | 5.54 | 5.53 | 5.67 | 5.51 |
| 1 | 4.98 | 5.10 | 5.31 | 5.86 | 5.77 |
| 2 | 4.25 | 4.50 | 4.55 | 5.33 | 5.33 |
| 3 | 4.03 | 4.28 | 4.27 | 4.70 | 4.83 |
| 4 | 3.98 | 4.26 | 4.25 | 4.70 | 4.86 |
| 5 | 3.97 | 4.23 | 4.23 | 4.70 | 4.93 |
| 10 | 3.87 | 4.08 | 4.15 | 4.73 | 5.03 |

EXAMPLE XXII

Digested sludge untreated

| Incubation Time Day | Percent Lactose | | | | |
|---|---|---|---|---|---|
| | 5% | 3% | 1% | .50% | .25% |
| 0 | 6.05 | 5.97 | 5.93 | 5.97 | 6.15 |
| 1 | 4.80 | 4.82 | 4.85 | 5.03 | 6.07 |
| 2 | 4.48 | 4.55 | 4.73 | 5.21 | 7.00 |
| 3 | 4.27 | 4.33 | 4.78 | 5.75 | 7.33 |
| 4 | 4.15 | 4.23 | 4.95 | 6.20 | 7.50 |
| 5 | 4.20 | 4.22 | 5.00 | 6.60 | 7.70 |
| 10 | 3.62 | 4.80 | 5.20 | 7.40 | 8.05 |

The following tables 1 through 6 summarize the results of Examples XVII through XXII.

Both the digested and raw sludges were lighter in color after digestion. The raw sludge, in particular, was very light appearing light gray. Whenever the pH became lower than 4.0 the protein appeared to have coagulated (this was more clear in the raw sludge than in the digested sludge). When poured through two layers of cheese cloth the raw sludge readily formed a fairly dry cake.

Table 1

Raw sludge irradiated (4 meg rad)

| Lactose | pH |
|---|---|
| 5% | 3.68 |
| 3% | 3.73 |
| 1% | 3.76 |
| .50% | 3.49 |
| .25% | 3.97 |

Table 2

Raw sludge heat sterilized

| Lactose | pH |
|---|---|
| 5% | 3.98 |
| 3% | 4.02 |
| 1% | 4.10 |
| .50% | 3.49 |
| .25% | 3.80 |

Table 3

Raw sludge not sterilized

| Lactose | pH |
|---|---|
| 5% | 3.33 |
| 3% | 3.50 |
| 1% | 5.30 |
| .50% | 4.58 |
| .25% | 5.35 |

Table 4

Digested sludge irradiated (4 meg rad)

| Lactose | pH |
|---|---|
| 5% | 3.93 |
| 3% | 4.00 |
| 1% | 4.05 |
| .50% | 4.73 |
| .25% | 5.13 |

Table 5

Digested sludge heat sterilized

| Lactose | pH |
|---|---|
| 5% | 3.87 |
| 3% | 4.08 |
| 1% | 4.15 |
| .50% | 4.73 |
| .25% | 5.03 |

Table 6

Digested sludge non sterilized

| Lactose | pH |
|---|---|
| 5% | 3.62 |
| 3% | 4.80 |
| 1% | 5.20 |
| .50% | 7.40 |
| .25% | 8.05 |

For the examples following, XXIII through XXVIII the concentration of the *L. plantarum* used was $1.3 \times 10^3$/ml.

EXAMPLE XXIII

Raw sludge irradiated (4 meg rad)

| Incubation Time Day | Percent Lactose | | | | |
|---|---|---|---|---|---|
| | 5% | 3% | 1% | .50% | .25% |
| 0 | 6.15 | 6.20 | 6.30 | 6.25 | 6.23 |
| 1 | 5.55 | 5.70 | 5.70 | 5.52 | 5.57 |
| 2 | 3.72 | 3.80 | 4.10 | 4.28 | 4.73 |
| 3 | 3.53 | 3.63 | 3.95 | 4.20 | 4.60 |
| 4 | 3.50 | 3.60 | 3.90 | 4.00 | 4.28 |
| 5 | 3.48 | 3.58 | 3.83 | 3.80 | 3.95 |
| 10 | 3.47 | 3.48 | 3.25 | 3.35 | 3.87 |

EXAMPLE XXIV

Raw sludge heat sterilized

| Incubation Time Day | Percent Lactose | | | | |
|---|---|---|---|---|---|
| | 5% | 3% | 1% | .50% | .25% |
| 0 | 6.00 | 6.00 | 6.00 | 6.02 | 6.07 |
| 1 | 6.20 | 6.20 | 6.25 | 6.27 | 6.30 |
| 2 | 5.20 | 4.98 | 5.90 | 6.13 | 6.30 |
| 3 | 4.02 | 4.05 | 4.65 | 5.30 | 6.25 |
| 4 | 3.83 | 3.88 | 4.15 | 4.45 | 5.73 |
| 5 | 3.72 | 3.85 | 3.97 | 4.05 | 4.85 |
| 10 | 3.60 | 3.70 | 3.78 | 3.80 | 4.05 |

EXAMPLE XXV

Raw sludge untreated

| Incubation time Day | Percent Lactose | | | | |
|---|---|---|---|---|---|
| | 5% | 3% | 1% | .50% | .25% |
| 0 | 5.70 | 5.80 | 5.85 | 5.85 | 5.85 |
| 1 | 4.88 | 4.90 | 4.90 | 4.92 | 5.35 |
| 2 | 3.98 | 4.05 | 4.15 | 4.48 | 5.38 |
| 3 | 4.02 | 4.05 | 4.25 | 4.72 | 5.40 |
| 4 | 4.00 | 4.07 | 4.43 | 4.88 | 5.45 |
| 5 | 4.00 | 4.35 | 4.65 | 5.00 | 5.50 |
| 10 | 4.20 | 4.05 | 5.45 | 5.00 | 5.58 |

EXAMPLE XXVI

Digested sludge irradiated (4 meg rad)

| Incubation Time Day | Percent Lactose | | | | |
|---|---|---|---|---|---|
| | 5% | 3% | 1% | .50% | .25% |
| 0 | 6.35 | 6.35 | 6.40 | 6.50 | 6.52 |
| 1 | 6.65 | 6.80 | 6.92 | 7.07 | 7.03 |
| 2 | 6.20 | 6.70 | 6.95 | 7.30 | 7.18 |
| 3 | 4.90 | 4.80 | 5.50 | 7.30 | 6.45 |
| 4 | 4.30 | 4.17 | 4.83 | 4.77 | 5.43 |
| 5 | 4.08 | 4.03 | 4.60 | 5.07 | 5.20 |
| 10 | 3.80 | 3.80 | 3.78 | 3.95 | 4.33 |

EXAMPLE XXVII

Digested sludge heat sterilized

| Incubation Time Day | Percent Lactose | | | | |
|---|---|---|---|---|---|
| | 5% | 3% | 1% | .50% | .25% |
| 0 | 5.77 | 5.75 | 5.75 | 5.85 | 5.85 |
| 1 | 6.23 | 6.15 | 6.23 | 6.30 | 6.25 |
| 2 | 5.30 | 6.03 | 6.30 | 6.45 | 6.38 |
| 3 | 4.68 | 5.03 | 5.90 | 6.42 | 6.48 |
| 4 | 4.07 | 4.25 | 4.95 | 5.83 | 5.67 |
| 5 | 3.80 | 3.97 | 4.60 | 5.30 | 5.45 |
| 10 | 3.72 | 3.77 | 3.83 | 3.90 | 4.80 |

EXAMPLE XXVIII

Digested sludge untreated

| Incubation Time Day | Percent Lactose | | | | |
|---|---|---|---|---|---|
| | 5% | 3% | 1% | .50% | .25% |
| 0 | 6.62 | 6.68 | 6.60 | 6.68 | 6.60 |
| 1 | 4.08 | 4.10 | 4.30 | 4.45 | 5.05 |
| 2 | 3.90 | 4.02 | 3.93 | 5.50 | 6.33 |
| 3 | 3.75 | 3.87 | 4.08 | 5.98 | 6.75 |
| 4 | 3.63 | 3.62 | 4.40 | 6.43 | 7.05 |
| 5 | 3.53 | 3.45 | 4.60 | 6.65 | 7.15 |
| 10 | 3.20 | 3.20 | 5.07 | 6.90 | 7.15 |

The results of Examples XXIII through XXVIII are summarized below in Tables 7-12. Comparing the results of Examples XVII through XXII with Examples XXIII through XXVIII there appears to be little difference between having an initial L. plantarum concentration of $10^7$/ml or $10^3$/ml.

Table 7

Raw sludge irradiated (4 meg rad)

| Lactose | pH |
|---|---|
| 5% | 3.48 |
| 3% | 3.58 |
| 1% | 3.83 |
| .50% | 3.80 |
| .25% | 3.95 |

Table 8

Raw sludge heat sterilized

| Lactose | pH |
|---|---|
| 5% | 3.72 |
| 3% | 3.85 |
| 1% | 3.97 |
| .50% | 4.05 |
| .25% | 4.85 |

Table 9

Raw sludge nonsterilized

| Lactose | pH |
|---|---|
| 5% | 4.00 |
| 3% | 4.35 |
| 1% | 4.65 |
| .50% | 5.00 |
| .25% | 5.50 |

Table 10

Digested sludge irradiated (4 meg rad)

| Lactose | pH |
|---|---|
| 5% | 4.08 |
| 3% | 4.03 |
| 1% | 4.60 |
| .50% | 5.07 |
| .25% | 5.20 |

Table 11

Digested slude heat sterilized

| Lactose | pH |
|---|---|
| 5% | 3.80 |
| 3% | 3.97 |
| 1% | 4.60 |
| .50% | 5.30 |
| .25% | 5.45 |

Table 12

Digested slude non-sterilized

| Lactose | pH |
|---|---|
| 5% | 3.53 |
| 3% | 3.45 |
| 1% | 4.60 |
| .50% | 6.65 |
| .25% | 7.15 |

In the above examples I through XXVIII the bacterial count of the non-sterilized raw and digested sludges was monitored. Coliforms and gram negative bacteria were plated on MacConkey Agar was incubated at 37° C. for 15 hours. The total bacteria (less L. plantarum) was plated on TSY Agar and was incubated at 30° C. for 15 hours. The L. plantarum was plated on Tomato Juice Agar Special plates containing 0.1 grams per liter bromocresol green.

The following summarizes the bacteriological results.

For raw sludge (non-sterilized) at initial time the coliforms equaled $1.33 \times 10^7$ per ml; total gram negative equaled $3.57 \times 10^7$ ml; total bacteria (less L. plantarum) equaled $7.2 \times 10^7$ ml. And the L. plantarum as added was $1.3 \times 10^3$ ml. One day 1 the coliform and total bacteria was approximately $2.0 \times 10^8$ and $3.0 \times 10^8$ respectively. On day 3 the coliform measurement was negative and total gram negative bacteria was negative, total bacteria present $2.3 \times 10^4$. On day 5 the results were the same as for day 3.

For digested sludge (non sterilized) the initial L. plantarum concentration as added was $1.3 \times 10^3$ ml; coliform $2.6 \times 10^4$; total gram negative bacteria $5.5 \times 10^4$ and total bacteria (less L. plantarum) $1.3 \times 10^5$. For day 1 the coliform was approximately $1.0 \times 10^6$; total gram negative approximately $2.0 \times 10^5$ and total bacteria was approximately $1.0 \times 10^7$. On day 3 coliform was $3.1 \times 10^4$; total gram negative $3.2 \times 10^4$; and total bacteria $1.6 \times 10^6$. On day 5 coliform was negative, total gram negative was negative and total bacteria was $2.1 \times 10^4$.

It can be seen from the above results that the addition of L. plantarum bacteria and lactose to sludge whether digested or raw and whether or not treated or untreated is sufficient over a predetermined period of time to lower the pH sufficiently such that the undesirable bacteria is reduced to a level wherein the treated sludge in this one step process renders it usable either as a feed stock for animals with the addition of other nutrients if desired) or as a fertilizer or fill.

The above examples and tables were directed to specifically to carbohydrate or the disaccharide lactose and the specific bacteria L. plantarum. The other species of the bacteria lactobaccilli alone or in combination are also suitable. The temperature range for growth is typically 5°-53° C. The Lactobacilli are acidophillic with an optimal initial pH range of 5.5 to 5.8 and clearly grows at a pH of 5.0 or less. The complex nutritional requirements of lactobaccilli for amino acids, peptides, nucleic acid derivatives, vitamins, salts, fatty acids or fatty acid esters appear to be present in typical sewage sludge. It has been found that additional fermentable carbohydrates however must be added to the sewage for the pH to drop below 4.5. Any one of the following bacteria or combinations thereof may be used with my invention: L. acidophilus, L. bulgaricus, L. casei, L. coryniformis, L. delbrucckii, L. helveticus, L. lactis, L. leichmannii, L. plantarum, L. thermophilus, L. xylosus, L. brevis, L. buchneri, L. coprophilus, L. fermentum, L. viridescens.

The carbohydrates used in the scope of my invention may be any carbohydrate such as amygdalin, arabinose, cellobiose, esculin, fructose, glactose, glucose, gluconate, lactose, maltose, mannitol, mannose, melezitose, melibiose, raffinose, rhamnose, ribosse, salicin, sorbitol, sucrose, trehalose, and xylose.

When the carbohydrate is added to the sludge containing the bacteria the pH will drop to below 4.5. Further there is a drastic reduction of all native bacteria normally found in sludge. There was approximately a $10^5$ reduction in coliform, total gram negative bacteria and total bacteria (excluding L. plantarum). Thus the innoculation of Lactobaccilli into raw or digested sludge, whether or not presterilized in the presence of additional carbohydrate results in the production of lactic acid. This lactic acid causes the inhibition of growth and death of the vast majority of bacteria normally found in the sludge.

In some of the Examples the sludge was sterilized. As is well known the sterilization step is transitory or temporary, in that within minutes undesirable bacteria growth will likely commence. I have discovered that sterilization followed immediately, within minutes or prior to contamination, by innoculation with lactobacillus and admixing of a carbohydrate allows any carbohydrate to be used successfully. Where there is no sterilization lactose in the preferred carbohydrate.

The following table lists the characteristics of sludge generally.

Table 13

| Parameter | Mean | Std. Dev. |
|---|---|---|
| TS | 38,800 | 23,700 |
| $BOD_5$ | 5,000 | 4,570 |
| $COD_T$ | 42,850 | 36,950 |
| TOC | 9,930 | 6,990 |
| TKN | 677 | 427 |
| $NH_3$-N | 157 | 120 |
| Total P | 253 | 178 |
| pH (units) | 6.9 (median) | — |

All values in mg/l unless otherwise indicated.

Digested sludge, as is well known in the art, is simply the raw sludge which has been anaerobically digested.

Although my process effects conversion of the sludge in about two days as will be apparent to those skilled in the art, accelerators may be used to enhance the conversion. If desired after the sludge has been stabilized and is removed, a portion of the stabilized sludge may be recycled and used for innoculation and pH adjustment of a new batch of untreated raw or digested sludge.

Having described my invention what I now claim is:

1. A method for the treatment of sewage sludge which treatment renders the sludge environmentally acceptable which includes:
   inoculating the sludge with Lactobacillus the sludge per se containing the nutritional requirements for the lactobacilli; and
   admixing a fermentable carbohydrate in an effective amount with the sludge, the Lactobacillus inoculated and the carbohydrate admixed in an amount sufficient to lower the pH of the sludge to below 4.5 to render the sludge substantially free of coliform, and pathogenic bacteria.

2. The method of claim 1 wherein the sludge is raw sludge and which includes:
   sterilizing the sludge by heating the sludge prior to innoculation and admixing.

3. The method of claim 1 wherein the sludge is raw sludge and which includes:
   sterilizing the sludge by irradiation prior to innoculation and admixing.

4. The method of claim 1 wherein the sludge is digested sludge and which includes:
   sterilizing the sludge by heating the sludge prior to innoculating and admixing.

5. The method of claim 1 wherein the sludge is digested sludge and which includes:
   sterilizing the sludge by irradiation prior to innoculation and admixing.

6. The method of claim 1 wherein the sludge is untreated raw sludge.

7. The method of claim 1 wherein the sludge is untreated digested sludge.

8. The method of claim 2, 3, 4, 5, 6, or 7 wherein the carbohydrate is lactose and wherein the bacteria is *L. plantarum*.

9. The method of claim 8 wherein the amount of *L. plantarum* in the sludge increases from $10^3$ to $10^9$ as the pH drops below 4.5.

10. The method of claim 8 wherein the lactose added is between 0.25 to 5% based on the total volume of the sludge.

11. The method of claim 1 wherein the carbohydrate is lactose.

12. The method of claim 1 wherein the Lactobacillus is *L. plantarum*.

13. The method of claim 1 which includes:
    maintaining the sludge at a temperature of between about 5°–53° C.

14. The method of claim 1 which includes maintaining the temperature of the sludge between about 30°–35° C.

15. The method of claim 1 wherein the Lactobacillus is *L. plantarum* and the carbohydrate is lactose.

16. The method of claim 1 wherein the bacteria is selected from the group consisting of *L. acidophilus, L. bulgaricus, L. casei, L. coryniformis, L. debrucckii, L. helveticus, L. Lactis, L. Leichmannii, L. plantarum, L. Thermophilus, L. Xylosus, L. brevis, L. buchneri, L. corprophilus, L. fermentum, L. viridescens* and combinations thereof.

17. The method of claim 16 wherein the bacteria is *L. casei*.

18. The method of claim 1 wherein the carbohydrate is selected from the group consisting of Amygdalin, Arabinose, Cellobiose, Fructose, Galactose, Glucose, Gluconate, Lactose, Maltose, Mannitol, Mannose, Melezitose, Melibiose, Raffinose, Rhamnose, Ribose, Salicin, Sorbitol, Sucrose, Trehalose, Xylose, Esculin and combinations thereof.

19. The method of claim 18 wherein the carbohydrate is lactose and wherein the bacteria is *L. plantarum*.

20. The method of claim 18 wherein the carbohydrate is glucose.

21. The method of claim 1 which includes:
    adding ammonia to the sludge to produce ammonium lactate.

22. The method of claim 1 which includes:
    innoculating the sludge with treated sludge.

23. The method of claim 1 wherein the bacteria is *L. casei* and the carbohydrate is glucose.

* * * * *